(12) United States Patent
Proni et al.

(10) Patent No.: US 7,314,305 B2
(45) Date of Patent: Jan. 1, 2008

(54) THERMALLY REGULATED CLOSED MIXER

(75) Inventors: Antonio Proni, Lodi (IT); Daniele Balasso, Calusco d'Adda (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 11/502,365

(22) Filed: Aug. 11, 2006

(65) Prior Publication Data

US 2006/0274600 A1 Dec. 7, 2006

Related U.S. Application Data

(63) Continuation of application No. 11/229,610, filed on Sep. 20, 2005, now abandoned, which is a continuation of application No. 10/363,985, filed as application No. PCT/EP01/09855 on Aug. 27, 2001, now abandoned.

(60) Provisional application No. 60/233,481, filed on Sep. 19, 2000.

(30) Foreign Application Priority Data

Sep. 12, 2000 (EP) .................................. 00119814

(51) Int. Cl.
*B29B 7/28* (2006.01)
(52) U.S. Cl. ..................................... 366/145; 366/76.7
(58) Field of Classification Search ............... 366/76.7, 366/77, 91, 97–99, 145, 189; 700/299–300
See application file for complete search history.

(56) References Cited

U.S. PATENT DOCUMENTS

| | | | |
|---|---|---|---|
| 3,999,046 A | 12/1976 | Porter | |
| 4,076,220 A | 2/1978 | Nakashima et al. | |
| 4,443,110 A | 4/1984 | den Otter | |
| 4,455,091 A | 6/1984 | Bamberger et al. | |
| 4,818,113 A | 4/1989 | Patel | |
| 4,843,576 A * | 6/1989 | Smith et al. ................ | 700/299 |
| RE33,214 E | 5/1990 | Crocker et al. | |
| 5,149,193 A * | 9/1992 | Faillace ..................... | 366/145 |
| 5,170,344 A | 12/1992 | Berton et al. | |
| 5,259,670 A | 11/1993 | Brown | |
| 5,865,535 A | 2/1999 | Edwards | |
| 6,726,352 B2 | 4/2004 | Proni et al. | |
| 6,817,748 B2 | 11/2004 | Campanelli et al. | |

FOREIGN PATENT DOCUMENTS

| | | |
|---|---|---|
| DE | 901 309 | 5/1953 |
| EP | 0 244 121 A1 | 11/1987 |
| GB | 2 084 035 | 4/1982 |
| SU | 1318420 A1 | 6/1987 |
| WO | WO 99/24230 | 5/1999 |

* cited by examiner

*Primary Examiner*—David Sorkin
(74) *Attorney, Agent, or Firm*—Finnegan, Henderson, Farabow, Garrett & Dunner, L.L.P.

(57) ABSTRACT

A method for mixing a compound in a closed-batch mixer includes predetermining a minimum temperature of a mixer body for starting a mixing cycle; predetermining a preheating temperature for a thermal-regulation system of the mixer as a first set point; predetermining a working temperature for the system as a second set point; predetermining a thermal-hysteresis value of the mixer body; predetermining a first temperature of the mixer body for switching the system from the first to the second set point; predetermining a second temperature of the mixer body for switching the system from the second to the first set point; directly measuring mixer-body temperature using continuous, real-time measurement; comparing the mixer-body temperature to the first and second temperatures; and switching the system from the first to the second set point or from the second to the first set point, if required, as a result of the comparison.

23 Claims, 2 Drawing Sheets

THERMALLY REGULATED CLOSED MIXER

CROSS-REFERENCE TO RELATED APPLICATIONS

This is a continuation of application Ser. No. 11/229,610, filed Sep. 20, 2005, now abandoned, which is a continuation of application Ser. No. 10/363,985 filed Jul. 15, 2003, filed Aug. 27, 2001 as PCT/EP01/09855, now abandoned; which claims priority under 35 U.S.C. 119(a)-(d) to European Patent Application No. 00119814.2, filed 12 Sep. 2000 and claims the benefit under 35 U.S.C. 119(e) of Provisional Application No. 60/233,481, filed Sep. 19, 2000; the contents of all of which are relied upon and incorporated herein by reference.

In a general aspect the present invention relates to a process for producing a compound in a closed batch mixer, and more particularly to a method for setting the thermal parameters of the body mixer before and during the processing of this compound.

Hereinbelow, with the expression "closed batch mixer" it is intended an apparatus comprising a closed container enfolding a pair of rotors revolving in opposite directions to mix the various ingredients of a compound. The apparatus further comprises a cylinder located at the top of the container, whose piston, commonly known as ram, is driven either upwards to open the container and allow the introduction of the ingredients of the compound from suitable filling hoppers or downwards to exert a pressure on the material being processed above the pair of rotors.

A device placed at the bottom of the container allows the compound to be emptied out at the end of the processing cycle, via the opening of a suitable outlet.

Apparatus of the type mentioned above are, for example, of the "Banbury®" type, processing the material by means of a pair of tangential rotors, while other apparatus, known under the name "Intermix®", process the material by means of a pair of intermeshing rotors.

These apparatus are called "closed batch mixers" as they operate in a discontinuous or batchwise manner, i.e. a new batch of ingredients is charged in the mixer only after the complete discharge of the previous batch.

As "batchwise manner" production it is intended the production of defined quantities (batch) of compound in a discontinuous manner, each batch being processed starting from the ingredients till to complete compound dumping.

Hereinbelow, the material being processed during the various phases will be referred to as the compound.

A compound which can be prepared according to the invention is a compound, for example, of the type comprising an unsaturated-chain polymer base, in case crosslinked with sulphur, which is added to at least one silica filler and a silica-binding agent containing at least one sulphur atom. Particularly, the silica filler is a reinforcing agent based on silicon dioxide (silica), silicates or mixtures thereof, with a surface area, measured by the BET method, of between 80 and 220 $m^2/g$, preferably between 160 and 180 $m^2/g$. As for the silica-binding agent, it is intended, for example, a silane containing sulphur, such as bis(3-triethoxysilylpropyl)-tetrasulfide.

It should be noted that the final properties of a ready-to-use compound, and consequently the quality of the finished product, depend not only on its formula, but also, to a large extent, on the consistency of the properties of the ingredients used, which can vary from one batch to another, and on the consistency of the specific process parameter values, which can themselves vary randomly during the processing of the batch.

For this reason, the quality of a compound produced by batch mixer processes is attained by first producing a test compound and checking the properties of a number of samples, particularly after vulcanisation. Then, if one or more of these properties do not fit the set ranges, it takes to correct the values of the various process parameters as and when necessary by trial and error, until the desired result is achieved.

After the values of the various process parameters have been pre-set in the above mentioned manner, the consistency of the properties of the compound produced, which is necessary in order to guarantee that the product has the desired requirements, is controlled by carrying out repeated checks on the properties both of the single batch and of the final compound.

The problem to be solved is that of ensuring the reproducibility of the properties of the approved compound, for all the identical compounds subsequently produced, batch after batch.

Before approving the compound for subsequent use and authorising the production of a new batch, a number of checks on the compound's properties is carried out. This involves long waiting times before the results of the tests are known and the risk of having produced large amounts of unsuitable material, which will have to be rejected, before being able to ascertain this unsuitability.

SU-A-1318420 (in the name of Kiev Poly) teaches "to maintain the pressure of a heating carrier circulating in a mixer apparatus at a given temperature for increasing the thermal stabilisation of the working surfaces of the rotors and the quality of the final product".

GB-B-2084035 (in the name of Werner & Pfleiderer) discloses the monitoring of the working material temperature and its comparison with the power consumption of the mixer motor for achieving better characteristics of the working material in a shorter time.

EP-B-244121 (in the name of Farrel Bridge Ltd.) relates to a process for mixing a polymeric composition wherein the control of the mixer temperature is associated to the adjustment of the speed rotors and/or of the pressure applied by the ram. This should result in a completely homogeneous mixture with minimum of operator attention.

WO 99/24230 (in the name of M. A. Hanna Rubber Compounding) discloses a system for controlling the mixing of polymeric material and additive for providing quality products and batch-to-batch product uniformity. For this scope the temperature of the batch is controlled and corrected within a predetermined temperature profile through the adjustment of at least one of the rotor speed and the ram pressure. This document says that the mixer is preferably equipped with an automated system programmed to store various mixing cycle parameters such as, inter alia, the pre-set mixer wall temperature. It is underlined that the time for starting the claimed control system depends on the type of material to be compounded. For example, the batch temperature is not homogeneous at the start of the mixing cycle when stiff or highly viscous components, such as natural rubber, are employed. For these types of material, the control start time would be delayed until a time after the start of the mixing cycle. For components with a low viscosity, such as material undergoing a second mixing cycle in the mixer, the control could be started at the beginning of the mixing cycle.

More specifically, when a new production process is started or re-started, the first batches are produced under transient conditions (temperature, time, energy) which reach their normal operating values after some working cycles. This irregularity, herein named as first batch effect, affects the duration of the mixing cycle and the uniformity of the compound.

The first batch effect involves generally up to the first three or four batches from the beginning of the process, depending on the room temperature, kind of materials and process temperature.

It has now been found that, by predetermining and setting temperature parameters of the closed batch body mixer only, without considering the temperature of the compounded mass, it is possible to minimise the first batch effect in such a way that, already starting from the very first batch, the cycle time and the quantity of energy employed are within the required average values. Thus the uniformity of the final product is improved.

BRIEF DESCRIPTION OF THE DRAWINGS

Further features and advantages will be best understood from the detailed description of an exemplary, but non-exclusive, embodiment of a method and process for mixing a compound in a closed-batch mixer according to the present invention. This description will be taken hereinafter with reference to the accompanying drawings, given by way of non-limiting example, in which.

DESCRIPTION OF THE EMBODIMENTS

Figure 1:
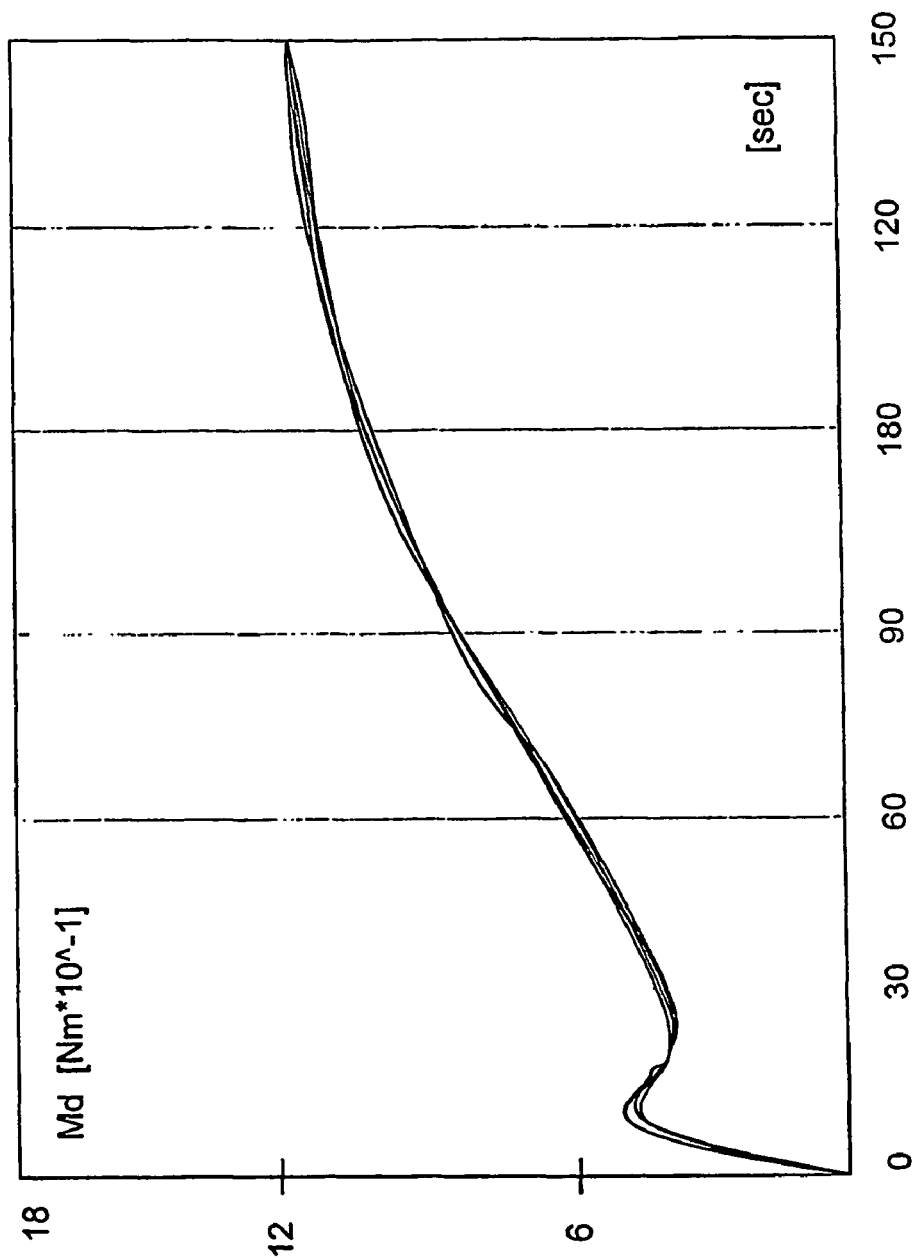
FIG. 1 is a graph of rheometric characteristics of a cured compound produced according to the present invention.

In the present description by "continuous real time measurement" it is intended a measurement effected at intervals preferably no longer than 1 second.

Therefore the present invention relates to a method for minimising the first batch effect in the mixing of a compound in a closed batch mixer, including the phases of
predetermining a minimum mixer body temperature value for starting the mixing cycle;
predetermining a mixer thermal regulation system pre-heating temperature as Set Point 1;
predetermining a mixer thermal regulation system working temperature as Set Point 2;
predetermining a mixer body temperature Break Point A for switching the mixer thermal regulation system from Set Point 1 to Set Point 2;
predetermining a mixer body temperature Break Point B for switching the mixer thermal regulation system from Set Point 2 to Set Point 1;
directly measuring, in a continuous real-time, the mixer body temperature;
comparing the mixer body temperature to the predetermined Break Point temperatures A and B; and
switching the mixer thermal regulation system from one Set Point to the other as a result of the above comparison.

Preferably the switching from Set Point 2 to Set Point 1 is excluded when the mixer cycle is running.

Preferably, the measure of the mixer body temperature is carried out by providing at least two sensors on the external surface of the body mixer.

Preferably, as a mixer body temperature is considered the average value of the temperatures measured by the sensors.

More preferably, the above said predetermined temperature values are stored and managed by a computerised control system.

For each kind of compound to be produced, a specific set of temperature values shall be predetermined and controlled.

The Set Point 1 and the Set Point 2 are determined as defined temperatures of a thermal regulation fluid, for example, water.

The Break Point A is said minimum temperature of the mixer body plus the thermal hysteresis of the mixer body.

The Break Point B is the result of the following equation:

$$\text{Break point } A - \left(\frac{\text{mixer thermal hysteresis}}{2}\right)$$

Furthermore, the present invention relates to a process for mixing a compound in a closed batch mixer comprising
a) predetermining a minimum mixer body temperature value for starting the mixing cycle;
b) predetermining a mixer thermal regulation system pre-heating temperature as Set Point 1;
c) predetermining a mixer thermal regulation system working temperature as Set Point 2;
d) predetermining a mixer body temperature Break Point A for switching the mixer thermal regulation system from Set Point 1 to Set Point 2;
e) predetermining a mixer body temperature Break Point B for switching the mixer thermal regulation system from Set Point 2 to Set Point 1;
f) directly measuring, in a continuous real-time, the mixer body temperature;
g) comparing the mixer body temperature to the predetermined Break Point temperatures A and B;
h) switching the mixer thermal regulation system from one Set Point to the other as a result of the above comparison;
i) enabling the mixing cycle to start when the minimum body temperature is exceeded;
j) introducing the materials to be mixed into the mixing chamber at intervals;
k) continuously monitoring the mixer body temperature in real time;
l) continuously transmitting the signal representing the monitored real time mixer body temperature value to the process control system;
m) switching to Set Point 2 when the mixer body temperature is equal or higher than Break Point A temperature; and
n) switching to Set Point 1 when the mixing cycle is not running and the mixer body temperature is lower than Break Point B temperature.

The method and the process of the present invention may be applied irrespective on the kind of compound to be processed. Particularly, the method and process of the invention give most favourable results when applied to silica-filled compounds.

By applying the teachings of the present invention the uniformity of the final compound is improved also for the first batches, in such as the cycle time and the quantity of energy employed in said first batches conform to the average values of the subsequent batches.

The invention will be now better illustrated by the following non limitative examples.

EXAMPLE 1

A lot of fifty batches of compound was produced using the following ingredients (the amount is expressed in p.h.r.—part hundred rubber), for a total amount of 230 kg per batch:

| | |
|---|---|
| Natural rubber | 8.00 |
| Polybutadiene | 20.00 |
| SBR ("solution") | 72.00 |
| Extender oil | 5.00 |
| Silica | 63.00 |
| Stearic acid | 2.00 |
| Zinc oxide* | 2.50 |
| Processing aid | 2.00 |
| Silane (50% predispersed) | 10.00 |
| Wax* | 1.00 |
| TMQ - type amine anti-fatigue* | 1.00 |
| 6PPD - type amine anti-ageing* | 2.00 |
| Sulphur** | 1.20 |
| CBS - type sulfenamide accelerating** | 2.00 |
| Diphenylguanidine accelerating (80% active)** | 0.80 |

The following mixing cycle description and time calculation is referred to masterbatch batch containing the ingredients of the above list without the asterisk. The ingredients marked by an asterisk are added in the remill, and those marked by two asterisks are added in the final stage.

A mixing cycle was started by predetermining the following temperature values:

minimum mixer body temperature=35° C.
mixer body thermal hysteresis=10° C.
Set Point 1=55° C.
Set Point 2=30° C.

Accordingly, the Break Point values were the following:

Break Point A=45° C.
Break Point B=40° C.

Before the beginning of the mixing cycle, the mixer body temperature was lower than 35° C., thus the control system enabled the switching to Set Point 1.

When the mixer body temperature reached a value equal to the minimum mixer body temperature, the mixing cycle was started.

When the mixer body temperature reached a value equal to the Break Point A, the control system enabled the switching to Set Point 2.

When the set Point 2 was on and the mixer cycle was stopped, after the dumpling of the mixer, the mixer body temperature became lower than the Break Point B; thus the control system enabled again the switching to Set Point 1.

By applying the above disclosed set of temperatures, the duration of the first batch mixing cycles was substantially equal to that of the subsequent batch mixing cycles, as set forth in the following Table 1 referring to mixing cycles carried out according to the present invention. Table 2 refers to the mixing cycles carried out without the control system of the invention. In particular, the duration of the mixing cycle of the first 3 batches of each lot was compared with that of randomly selected subsequent batches (18 and 26).

TABLE 1

| Batch | Duration of the mixing cycle (sec) |
|---|---|
| 1 | 257 |
| 2 | 257 |
| 3 | 254 |
| 18 | 255 |
| 26 | 256 |

TABLE 2

| Batch | Duration of the mixing cycle (sec) |
|---|---|
| 1 | 335 |
| 2 | 308 |
| 3 | 289 |
| 18 | 274 |
| 26 | 269 |

As appears from the comparison of the time data, the duration of the first batch mixing cycles of the process according to the present invention are consistently uniform with the subsequent batches in term of mixing time. The values set forth in Table 2 show a remarkable discrepancy, mainly among batch 1 and batches 18 and 26.

EXAMPLE 2

The rheometric characteristics of the cured compound of example 1 produced according to the invention were evaluated and compared with the same compound obtained without applying the present teachings.

The rheometric characteristics for each batch were measured according to known techniques (Monsanto MDR rheometer; curing condition: 185° for 180 seconds).

In Table 3, the required rheometric characteristics for the cured compound of example 1 are set forth.

TABLE 3

| Rheometric Characteristics | Central Value | Standard deviation ($1\sigma$) on the first 5 batches according to the invention | Standard deviation ($1\sigma$) on the first 5 comparison reference batches |
|---|---|---|---|
| $M_L$ (dNm) | 3.7 | 0.055 | 0.084 |
| $M_H$ (dNm) | 12.2 | 0.167 | 0.421 |
| $t_{30}$ (min) | 78 | 0 | 2.168 |
| $t_{60}$ (min) | 101 | 0.837 | 2.966 |

It is known that, according to the statistical law of Standard Deviation, given a certain number of values distributed around an average value, the standard deviation $1\sigma$ indicates, by its deviation from the average value, the size of the interval in which 68.26% of the values of the above mentioned quantity is found.

The Theory of Standard Deviation makes it possible to calculate easily, using a well-known mathematical formula, the standard deviation values for a set of given values. It is clear that a wide scatter of values around the average value will give rise to very large standard deviations, whereas a high concentration of values around the above mentioned average value will give rise to very small standard deviations.

In view of the above, the standard deviations set forth in table 3 for the first batches prepared according to the present invention demonstrate that the values relating to such batches are less scattered around the average value (central value) than those of the first batches of reference. This means that the rheometric characteristic of the first batches produced according to the present invention are more uniform to the central value of the entire production.

Figure 2:
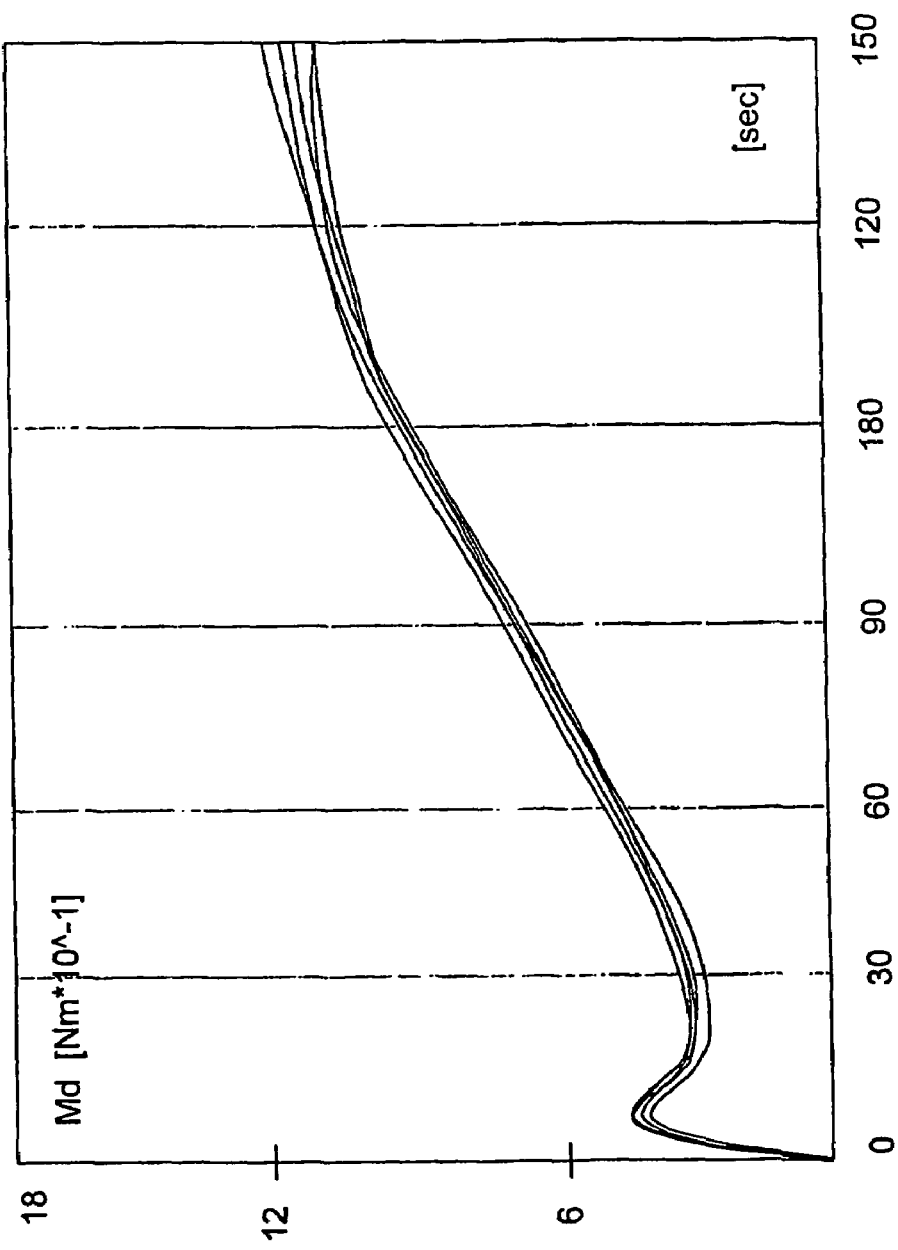
FIG. 2 is a graph of rheometric characteristics of the cured compound of FIG. 1 obtained without applying the present teachings.

The results are also set forth in FIGS. 1 and 2 depicting, respectively, the curves of the compound produced according to the invention and the one produced in the absence of the present teachings.

The curves of FIG. 1 are closer one to the other thus indicating a consistently minor dispersion of the rheometric characteristics and, accordingly, a superior uniformity of the compound.

The invention claimed is:

1. Method for mixing a compound in a closed batch mixer, including the phases of
   predetermining a minimum mixer body temperature value for starting the mixing cycle;
   predetermining a mixer thermal regulation system pre-heating temperature as Set Point 1;
   predetermining a mixer thermal regulation system working temperature as Set Point 2;
   predetermining a mixer body temperature Break Point A for switching the mixer thermal regulation system from Set Point 1 to Set Point 2;
   predetermining a mixer body temperature Break Point B for switching the mixer thermal regulation system from Set Point 2 to Set Point 1;
   directly measuring, in a continuous real-time, the mixer body temperature;
   comparing the mixer body temperature to the predetermined Break Point temperatures A and B; and
   switching the mixer thermal regulation system from one Set Point to the other as a result of the above comparison.

2. Method according to claim 1 wherein the switching from Set Point 2 to Set Point 1 is excluded when the mixer cycle is running.

3. Method according to claim 1 wherein the measure of the mixer body temperature is carried out by providing at least two sensors on the external surface of the body mixer.

4. Method according to claim 1 wherein the average value of the temperatures measured by the sensors is considered as a mixer body temperature.

5. Method according to claim 1 wherein the predetermined temperature values are stored and managed by a computerised control system.

6. Method according to claim 1 wherein Set Point 1 and Set Point 2 are determined as defined temperatures of a thermal regulation fluid.

7. Method according to claim 6 wherein the thermal regulation fluid is water.

8. Method according to claim 1 wherein the Break Point A is said minimum temperature of the mixer body plus a mixer body thermal hysteresis.

9. Method according to claim 8, wherein the mixer body thermal hysteresis is 10° C.

10. Method according to claim 1 wherein the Break Point B is the result of the following equation:

$$\text{Break point } B = \text{Break point } A - \left(\frac{\text{mixer thermal hystersis}}{2}\right).$$

11. Method according to claim 10, wherein the mixer thermal hysteresis is 10° C.

12. Process for mixing a compound in a closed batch mixer comprising
    a) predetermining a minimum mixer body temperature value for starting the mixing cycle;
    b) predetermining a mixer thermal regulation system pre-heating temperature as Set Point 1;
    c) predetermining a mixer thermal regulation system working temperature as Set Point 2;
    d) predetermining a mixer body temperature Break Point A for switching the mixer thermal regulation system from Set Point 1 to Set Point 2;
    e) predetermining a mixer body temperature Break Point B for switching the mixer thermal regulation system from Set Point 2 to Set Point 1;
    f) directly measuring, in a continuous real-time, the mixer body temperature;
    g) comparing the mixer body temperature to the predetermined Break Point temperatures A and B;
    h) switching the mixer thermal regulation system from one Set Point to the other as a result of the above comparison,
    i) enabling the mixing cycle to start when the minimum body temperature is exceeded;
    j) introducing the materials to be mixed into the mixing chamber at intervals;
    k) continuously monitoring the mixer body temperature in real time;
    l) continuously transmitting the signal representing the monitored real time mixer body temperature value to the process control system;
    m) switching to Set Point 2 when the mixer body temperature is equal or higher than Break Point A temperature; and
    n) switching to Set Point 1 when the mixing cycle is not running and the mixer body temperature is lower than Break Point B temperature.

13. Process according to claim 12 wherein the switching from Set Point 2 to Set Point 1 is excluded when the mixer cycle is running.

14. Process according to claim 12 wherein the measure of the mixer body temperature is carried out by providing at least two sensors on the external surface of the body mixer.

15. Process according to claim 12 wherein the average value of the temperatures measured by the sensors is considered as a mixer body temperature.

16. Process according to claim 12 wherein the predetermined temperature values are stored and managed by a computerised control system.

17. Process according to claim 12 wherein Set Point 1 and Set Point 2 are determined as defined temperatures of a thermal regulation fluid.

18. Process according to claim 17 wherein the thermal regulation fluid is water.

19. Process according to claim 12 wherein the Break Point A is the minimum temperature of the mixer body plus a mixer body thermal hysteresis.

20. Process according to claim 19, wherein the mixer body thermal hysteresis is 10° C.

21. Process according to claim 12 wherein the Break Point B is the result of the following equation:

$$\text{Break point } B = \text{Break point } A - \left(\frac{\text{mixer thermal hystersis}}{2}\right).$$

22. Process according to claim 21, wherein the mixer thermal hysteresis is 10° C.

23. Process according to claim 12 wherein the compound is a silica-filled compound.

* * * * *

UNITED STATES PATENT AND TRADEMARK OFFICE
CERTIFICATE OF CORRECTION

PATENT NO.         : 7,314,305 B2
APPLICATION NO.    : 11/502365
DATED              : January 1, 2008
INVENTOR(S)        : Proni et al.

It is certified that error appears in the above-identified patent and that said Letters Patent is hereby corrected as shown below:

In claim 10, column 7, lines 53-54,

" Break point B = Break point A $- \left( \dfrac{\text{mixer thermal hystersis}}{2} \right)$ . " should read -- Break Point B = Break point A $- \left( \dfrac{\text{mixer thermal hysteresis}}{2} \right)$ . --.

In claim 21, column 8, lines 57-58,

" Break point B = Break point A $- \left( \dfrac{\text{mixer thermal hystersis}}{2} \right)$ . " should read -- Break Point B = Break point A $- \left( \dfrac{\text{mixer thermal hysteresis}}{2} \right)$ . --.

Signed and Sealed this

Seventeenth Day of June, 2008

JON W. DUDAS
*Director of the United States Patent and Trademark Office*